United States Patent
Itagaki

(10) Patent No.: US 11,077,841 B2
(45) Date of Patent: Aug. 3, 2021

(54) CONTROL SYSTEM FOR HYBRID VEHICLE

(71) Applicant: TOYOTA JIDOSHA KABUSHIKI KAISHA, Toyota (JP)

(72) Inventor: Kenji Itagaki, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 348 days.

(21) Appl. No.: 15/699,624

(22) Filed: Sep. 8, 2017

(65) Prior Publication Data

US 2018/0072301 A1 Mar. 15, 2018

(30) Foreign Application Priority Data

Sep. 12, 2016 (JP) .............................. JP2016-177326

(51) Int. Cl.
| | |
|---|---|
| *B60W 20/10* | (2016.01) |
| *B60W 50/06* | (2006.01) |
| *B60W 20/19* | (2016.01) |
| *B60K 6/445* | (2007.10) |
| *B60W 10/06* | (2006.01) |
| *B60W 10/08* | (2006.01) |

(52) U.S. Cl.
CPC ............. *B60W 20/10* (2013.01); *B60K 6/445* (2013.01); *B60W 10/06* (2013.01); *B60W 10/08* (2013.01); *B60W 20/19* (2016.01); *B60W 50/06* (2013.01); *B60W 2510/0638* (2013.01); *B60W 2510/0657* (2013.01); *B60W 2510/0695* (2013.01); *B60W 2510/083* (2013.01); *B60W 2540/10* (2013.01); *B60W 2710/0644* (2013.01); *B60W 2710/0666* (2013.01); *B60W 2710/083* (2013.01); *Y02T 10/62* (2013.01); *Y02T 10/7072* (2013.01)

(58) Field of Classification Search
None
See application file for complete search history.

(56) References Cited

U.S. PATENT DOCUMENTS 5,735,770 A * 4/1998 Omote .................. B60K 6/365
477/5
5,899,286 A * 5/1999 Yamaguchi ............ B60K 6/365
180/65.21

(Continued)

FOREIGN PATENT DOCUMENTS

JP 2003-020972 A 1/2003
JP 2004336983 A 11/2004

(Continued)

OTHER PUBLICATIONS

Machine translation of JP2003020972 (Year: 2003).*

*Primary Examiner* — Navid Ziaeianmehdizadeh
(74) *Attorney, Agent, or Firm* — Hunton Andrews Kurth LLP

(57) ABSTRACT

The control system for a hybrid vehicle configured to ensure acceleration of the vehicle is provided. When accelerating the vehicle quickly, a torque command to an engine is calculated by adding a torque corresponding to an inertia torque of the engine that is required to increase an engine speed to the required engine torque. In this situation, a controller controls the engine in such a manner as to generate torque based on the calculated torque command, and controls a motor in such a manner as to generate reaction torque against a required engine torque.

6 Claims, 4 Drawing Sheets

(56) References Cited

U.S. PATENT DOCUMENTS

| | | | | |
|---|---|---|---|---|
| 2007/0111852 A1* | 5/2007 | Yatabe | ................... | B60K 6/445 |
| | | | | 477/107 |
| 2007/0227791 A1* | 10/2007 | Ueno | ................... | B60K 6/387 |
| | | | | 180/65.245 |
| 2008/0045382 A1* | 2/2008 | Kawasaki | ................ | B60K 6/40 |
| | | | | 477/115 |
| 2008/0220937 A1* | 9/2008 | Nozaki | ................. | B60K 6/365 |
| | | | | 477/86 |
| 2012/0322611 A1* | 12/2012 | Heap | .................... | B60W 10/02 |
| | | | | 477/5 |
| 2015/0057861 A1* | 2/2015 | Nakajima | ....... | B60W 30/18027 |
| | | | | 701/22 |
| 2015/0072819 A1* | 3/2015 | Ono | ....................... | B60K 6/365 |
| | | | | 475/5 |
| 2018/0274461 A1* | 9/2018 | Ujihara | ................ | B60W 10/06 |

FOREIGN PATENT DOCUMENTS

| | | |
|---|---|---|
| JP | 2005-180254 A | 7/2005 |
| JP | 2006-240608 A | 9/2006 |
| JP | 2006250111 A | 9/2006 |
| JP | 2014-111397 A | 6/2014 |

* cited by examiner

CONTROL SYSTEM FOR HYBRID VEHICLE

CROSS REFERENCE TO RELATED APPLICATIONS

The present invention claims the benefit of priority to Japanese Patent Application No. 2016-177326 filed on Sep. 12, 2016 with the Japanese Patent Office, the entire contents of which are incorporated herein by reference in its entirety.

BACKGROUND

Field of the Invention

Embodiments of the present disclosure relates to the art of a control system for a hybrid vehicle in which a prime mover includes an engine and a motor, and especially to a control system configured to accelerate the vehicle.

Discussion of the Related Art

In a hybrid vehicle taught e.g., by JP-A-2006-240608, motor mode is selected to power the vehicle only by a motor if large power is not demanded, and an operating mode is shifted to hybrid mode (or engine mode) to power the vehicle by an engine when an accelerator pedal is depressed deeply to increase a drive force during propelling the vehicle by the motor.

According to the teachings of JP-A-2006-240608, a planetary gear unit is used as a power split device. In the planetary gear unit, a carrier is connected to the engine, a sun gear is connected to a first motor, and a ring gear is connected to an output member to which torque of a second motor is applied. In a monographic diagram of this planetary gear unit, the carrier connected to the engine is situated between the sun gear connected to the engine and the ring gear to which the torque of the second motor is applied.

According to the teachings of JP-A-2006-240608, in the hybrid mode, the first motor is operated in such a manner as to control an engine speed while generating torque counteracting an engine torque. That is, the first motor establishes reaction torque to operate the engine in such a manner as to generate forward torque in an optimally fuel efficient manner.

In the hybrid vehicle of this kind, during propulsion in the hybrid mode, the engine speed and the engine torque are increased in response to an acceleration demand. In the hybrid mode, the engine speed is controlled in an optimally fuel efficient manner by generating reaction torque by the first motor serving as a generator, and the engine torque as drive torque is delivered to drive wheels in accordance with the reaction torque of the first motor and a gear ratio of the power split device. According to the teachings of JP-A-2006-240608, however, a speed of the first motor is increased in the forward direction when increasing the engine speed to accelerate the vehicle. To this end, the first motor has to generate torque in an opposite direction to the reaction torque. Consequently, the reaction torque of the first motor is partially cancelled by the torque required to increase the engine speed. For this reason, the drive torque may not be increased promptly when accelerating the vehicle until the engine speed is increased to a target speed.

SUMMARY

Aspects of preferred embodiments of the present application have been conceived noting the foregoing technical problems, and it is therefore an object of the present application is to provide a control system for a hybrid vehicle that is configured to ensure acceleration of the vehicle.

The control system according to embodiments of the present disclosure is applied to a hybrid vehicle, comprising: an engine; an output member transmitting power to drive wheels; a motor having a generating function; and a power split device that distributes output torque of the engine to the output member and the motor. The power split device includes an input element connected to the engine, a reaction element connected the motor, and an output element connected to the output member. The motor generates a reaction torque against the output torque of the engine generated based on a required engine torque when accelerating the vehicle so as to deliver the output torque of the engine to the drive wheels. The control system comprises a controller that is configured to: calculate a torque command to the engine by adding a torque corresponding to an inertia torque of the engine that is required to increase an engine speed to the required engine torque when accelerating the vehicle; control the engine in such a manner as to generate torque based on the calculated torque command; and control the motor in such a manner as to generate reaction torque against the required engine torque.

In a non-limiting embodiment, the controller may be further configured to calculate the torque command to the engine by adding the torque corresponding to the inertia torque of the engine to the required engine torque, when the motor generates torque corresponding to the inertia torque of the engine to increase the engine speed, and the torque of the motor is greater than a predetermined threshold value.

In a non-limiting embodiment, the controller may be further configured to calculate the torque of the motor corresponding to the inertia torque of the engine based on a difference between an actual engine speed and a target engine speed in a current routine, and based on a difference between the target engine speed in the current routine and the target engine speed after a lapse of predetermined period of time.

In a non-limiting embodiment, the controller may be further configured to: calculate the torque command to the engine based only on the required engine torque when the motor generates torque corresponding to the inertia torque of the engine to increase the engine speed, and the torque of the motor is smaller than the threshold value; control the engine in such a manner as to generate torque based on the calculated torque command; and control the motor in such a manner as to generate reaction torque against the required engine torque and the torque to increase the engine speed.

In a non-limiting embodiment, maximum output torque the engine that is applied to the input element of the power split device to increase the engine speed may be greater than maximum output torque of the motor that is applied to the input element of the power split device to increase the engine speed.

In a non-limiting embodiment, the control system may further comprise a torque booster that boosts the output torque of the engine to increase the engine speed.

In a non-limiting embodiment, the control system may further comprise another motor that is disposed between the output member and the drive wheels. Another motor may be operated by supplying electric power generated by the motor to generate torque applied to the drive wheels.

Thus, according to the embodiments of the present disclosure, the engine generates not only the torque corresponding to the inertia torque of the engine but also the required engine torque when the motor generates torque corresponding to the inertia torque of the engine to increase the engine speed, and the torque of the motor is greater than the threshold value. That is, when accelerating the vehicle quickly, the speed control of the engine by the motor is temporarily ceased while increasing the engine speed by the engine itself. According to the embodiments of the present disclosure, therefore, reaction torque of the motor against the engine torque will not be reduced to deliver the required engine torque to the drive wheels without being decreased. For this reason, the vehicle may be accelerated quickly to achieve desired acceleration of a driver.

As described, the maximum output torque of the engine is greater than the maximum output torque of the motor. According to the embodiments of the present disclosure, therefore, the engine may generate larger torque than the motor to increase the engine speed when accelerating the vehicle quickly. In addition, the output torque of the engine may be boosted by the torque booster.

Further, in the case that the motor serves as a generator to generate only the reaction torque against the required engine torque, generating amount of the motor may be increased thereby increasing output torque of another motor. In this case, therefore, drive force to propel the vehicle may be increased to accelerate the vehicle more quickly.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
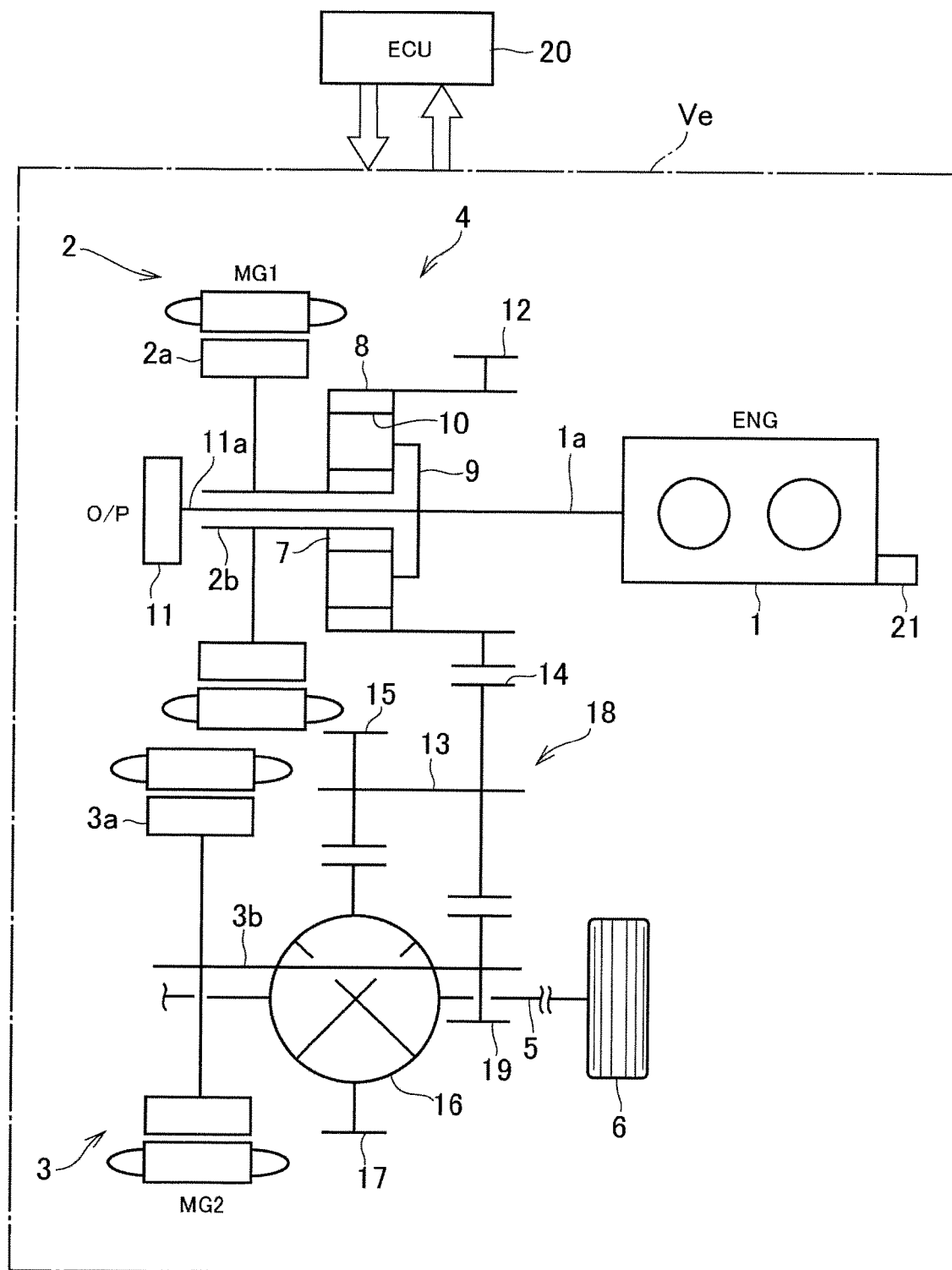
FIG. 1 is a schematic illustration showing a powertrain of the hybrid vehicle to which the control system according to the embodiment of the present disclosure is applied.

Embodiment of the present application will now be explained with reference to the accompanying drawings. Referring now to FIG. 1, there is shown one example of a powertrain of a hybrid vehicle (as will be simply called the "vehicle" hereinafter) Ve to which the control system according to the embodiment is applied. A prime mover of the vehicle Ve includes an engine (referred to as "ENG" in FIG. 1) 1 as a main prime mover, a first motor (referred to as "MG1" in FIG. 1) 2, and a second motor (referred to as "MG2" in FIG. 1) 3. An output power of the engine 1 is distributed to the first motor 2 and to a driveshaft 5 through a power split device 4. An electric power generated by the first motor 2 may be supplied to the second motor 3 to generate torque, and the output torque of the second motor 3 is delivered directly to the driveshaft 5.

Each of the first motor 2 and the second motor 3 is a motor-generator that is operated not only as a motor to generate torque by applying electric power thereto, but also as a generator to generate electric power by applying torque thereto. For example, a permanent magnet synchronous motor and an induction motor may be used as the first motor 2 and the second motor 3. The first motor 2 and the second motor 3 are connected to a storage device such as a battery and a capacitor through an inverter (neither of which are shown) so that electric power may be supplied to the first motor 2 and the second motor 3 from the storage device. The storage device may also be charged with electric power generated by the first motor 2 and the second motor 3.

The power split device 4 as a single-pinion planetary gear unit is connected to an output shaft 1a of the engine 1 to distribute output power of the engine 1 to the first motor 2 and to the driveshaft 5. The power split device 4 comprises a sun gear 7 as a reaction element, a ring gear 8 as an output element arranged concentrically with the sun gear 7, a plurality of pinion gears 10 interposed between the sun gear 7 and the ring gear 8, and a carrier 9 as an input element supporting the pinion gears 10 in a rotatable and revolvable manner.

In the power split device 4 the carrier 9 is connected to the output shaft 1a of the engine 1. That is, the output shaft 1a also serves as an input shaft of the power split device 4. In order to cool and lubricate the power split device 4, and to reduce fevers of the first motor 2 and the second motor 3 resulting from an iron loss or a copper loss, the first motor 2 and the second motor 3, an oil pump 11 is arranged on an opposite side of the engine 1 across the power split device 4. A rotary shaft 11a of the oil pump 11 is also connected to the carrier 9 so that the oil pump 11 is driven by the engine 1 to generate hydraulic pressure.

The first motor 2 is disposed between the oil pump 11 and the power split device 4, and in the first motor 2, a hollow rotor shaft 2b that is rotated integrally with a rotor 2a is connected to the sun gear 7 of the power split device 4. The above-mentioned rotary shaft 11a of the oil pump 11 penetrates through the rotor shaft 2b and the sun gear 7 to be connected to the output shaft 1a of the engine 1 through the carrier 9.

A first drive gear 12 as an external gear is integrally formed around the ring gear 8 of the power split device 4 to serve as an output member, and a countershaft 13 is arranged in parallel with a common rotational axis of the power split device 4 and the first motor 2. A counter driven gear 14 diametrically larger than the first drive gear 12 is fitted onto one end of the countershaft 13 (i.e., right side in FIG. 1) to be rotated integrally therewith while being meshed with the first drive gear 12 so that torque transmitted from the first drive gear 12 is multiplied. A counter drive gear (i.e., a final drive gear) 15 is fitted onto the other end of the countershaft 13 (i.e., left side in FIG. 1) in such a manner as to be rotated therewith while being meshed with a differential ring gear (i.e., a final driven gear) 17 of a deferential gear unit 16 as a final reduction. Thus, the ring gear 8 of the power split device 4 is connected to the driveshaft 5 and the drive wheels 6 through the first drive gear 12, the countershaft 13, the counter driven gear 14, the counter drive gear 15, and an output gear train 18 having the differential ring gear 17.

In the power train of the vehicle Ve, an output torque of the second motor 3 can be added to the torque delivered from the power split device 4 to the driveshaft 5. To this end, a rotor 3a of the second motor 3 is connected to a rotor shaft 3b extending in parallel with the countershaft 13 to rotate integrally therewith, and a second drive gear 19 is fitted onto a leading end of the rotor shaft 3b to be rotated integrally therewith while being meshed with the counter driven gear 14. Thus, the ring gear 8 of the power split device 4 and the second motor 3 are individually connected to the driveshaft 5 through the deferential gear unit 16 and the second drive gear 19.

An operating mode of the vehicle Ve may be selected from a hybrid mode (to be abbreviated as the "HV mode" hereinafter) in which the vehicle Ve is powered by the engine 1, and an electric vehicle mode in which the vehicle Ve is powered by the first motor 2 and the second motor 3 while supplying electric power to the motors 2 and 3 from the storage device. The operating mode of the vehicle Ve is shifted by an electronic control unit (to be abbreviated as the "ECU" hereinafter) 20 as a controller that is electrically connected to the engine 1, the first motor 2 and the second motor 3. The ECU 20 is composed mainly of a microcomputer configured to carry out a calculation based on incident data, stored data and stored programs, and transmit a calculation result in the form of command signal. For example, a vehicle speed, a wheel speed, a position of an accelerator pedal, a state of charge (to be abbreviated as the "SOC" hereinafter) of the storage device and so on are sent to the ECU 20, and maps determining the operating mode, optimally fuel efficient points of the engine 1, required engine power $Pe\_req$ and so on are installed in the ECU 20. Specifically, the ECU 20 transmits command signals for starting and stopping the engine 1, torque command signals for operating the first motor 2 and the second motor 3 and so on. Optionally, a plurality of the ECUs may be arranged in the hybrid vehicle according to need.

In the HV mode, output power of the engine 1 is delivered to the drive wheels 6 by connecting the engine 1 to the power split device 4 while applying reaction torque of the first motor 2 to the power split device 4. In this situation, in the power split device 4, the sun gear 7 serves as the reaction element. Specifically, the engine 1 generates required engine torque $Te\_req$ calculated based on an acceleration demand, and the first motor 2 generates reaction torque counteracting the required engine torque $Te\_req$ to deliver output torque of the engine 1 to the drive wheels 6.

A rotational speed of the first motor 2 may be controlled arbitrarily in accordance with a value and a frequency of current applied thereto, and an engine speed Ne may be controlled by controlling the rotational speed of the first motor 2. To this end, specifically, required drive force is calculated based on a position of the accelerator pedal and a vehicle speed, and required engine power $Pe\_req$ is calculated based on the required drive force. Then, engine torque $Te\_req$ required by the driver (as will be called the "required engine torque $Te\_req$" hereinafter) is calculated based on the required engine power $Pe\_req$ and the current engine speed Ne. Thereafter, an operating point of the engine 1 is determined on an optimum fuel efficiency curve based on the required engine torque $Te\_req$ and the current engine speed Ne. After thus determining the operating point of the engine 1, a rotational speed of the first motor 2 is controlled in such a manner as to operate the engine 1 at the determined operating point. Specifically, output torque Tg or a rotational speed of the first motor 2 is controlled in accordance with the torque of the engine 1 delivered to the power split device 4 so as to adjust the engine speed Ne to a target engine speed $Ne\_req$. Since the engine speed Ne is changed by changing the speed of the first motor 2, the engine speed Ne may be changed continuously.

Thus, the engine speed Ne is controlled by the first motor 2, and the output torque Tg of the first motor 2 is controlled in accordance with the required engine torque $Te\_req$. In this situation, the first motor 2 serves as a reaction member. When accelerating the vehicle Ve, in order to increase the engine speed Ne to a required engine speed $Ne\_req$ ($Ne\_req>Ne$), torque greater than inertia torque of the engine 1 is required to be generated by any of the engine 1, the first motor 2 and the second motor 3.

For example, when the vehicle Ve is cruising, or when accelerating the vehicle Ve mildly, the engine speed Ne is increased by the first motor 2. In this situation, the first motor 2 generates the output torque Tg taking account of the inertia torque of the engine 1 as expressed by the following expression:

$$Tg=-\rho/(1+\rho)\cdot Te\_req+Tg\_iner$$

where "$-\rho/(1+\rho)\cdot Te\_req$" is the above-expressed reaction torque, "$Tg\_iner$" is torque of the first motor 2 to increase the engine speed Ne corresponding to the inertia torque of the engine 1, and "$\rho$" is a gear ratio of the power split device 4 that is governed by a ratio between teeth number of the sun gear 7 and teeth number of the ring gear 8.

By contrast, when accelerating the vehicle Ve quickly, the first motor 2 has to generate the larger torque $Tg\_iner$ corresponding to the inertia torque of the engine 1 to increase the engine speed Ne. In this case, if the engine speed Ne is increased by the first motor 2, the reaction torque of the first motor 2 acting in the opposite direction to the torque $Tg\_iner$ of the first motor 2 to deliver the required engine torque $Te\_req$ to the drive wheels 6 is decreased by increasing the torque $Tg\_iner$. Consequently, the required engine torque $Te\_req$ may not be delivered sufficiently to the drive wheels 6 and hence required acceleration may not be achieved. In order to avoid such disadvantage, according to the embodiments of the present disclosure, the engine 1 generates not only the required engine torque $Te\_req$ but also the inertia torque $Te\_iner$ of the engine 1 when accelerating the vehicle Ve quickly. To this end, the inertia torque $Te\_iner$ of the engine 1 may be obtained by converting torque $Tg\_iner$ generated by the first motor 2 corresponding to the inertia torque of the engine 1 into a shaft torque of the engine 1, using the following formula:

$$Te\_iner=(1+\rho)/\rho\cdot Tg\_iner.$$

Maximum output torque $Te\_max$ of the engine 1 that is applied to the carrier 9 is greater than maximum output torque $Tg\_max$ of the first motor 2 that is applied to the carrier 9. As described, when accelerating the vehicle Ve quickly, the engine 1 generates the required engine torque $Te\_req$ as well as the inertia torque $Te\_iner$ of the engine 1. To this end, the engine 1 is adapted to generate a total torque of at least the maximum output torque $Tg\_max$ of the first motor 2 and the inertia torque $Te\_iner$ of the engine 1. Specifically, a relation between the maximum output torque $Te\_max$ of the engine 1 and the maximum output torque $Tg\_max$ of the first motor 2 may be expressed as the following expression:

$$Te\_max>|(1+\rho/\rho)\cdot Tg\_max|.$$

The maximum output torque $Te\_max$ of the engine 1 and the maximum output torque $Tg\_max$ of the first motor 2 may be altered arbitrarily according to need. In order to accelerate the vehicle Ve quickly, the output torque Te of the engine 1 may be boosted by a supercharger (or a torque booster) 21 to compensate the inertia torque $Te\_iner$ of the engine 1. According to the embodiments of the present disclosure, the supercharger 21 includes a mechanical supercharger that is driven by the output shaft 1a of the engine 1 and a turbocharger that is driven by exhaust gas.

Figure 2:
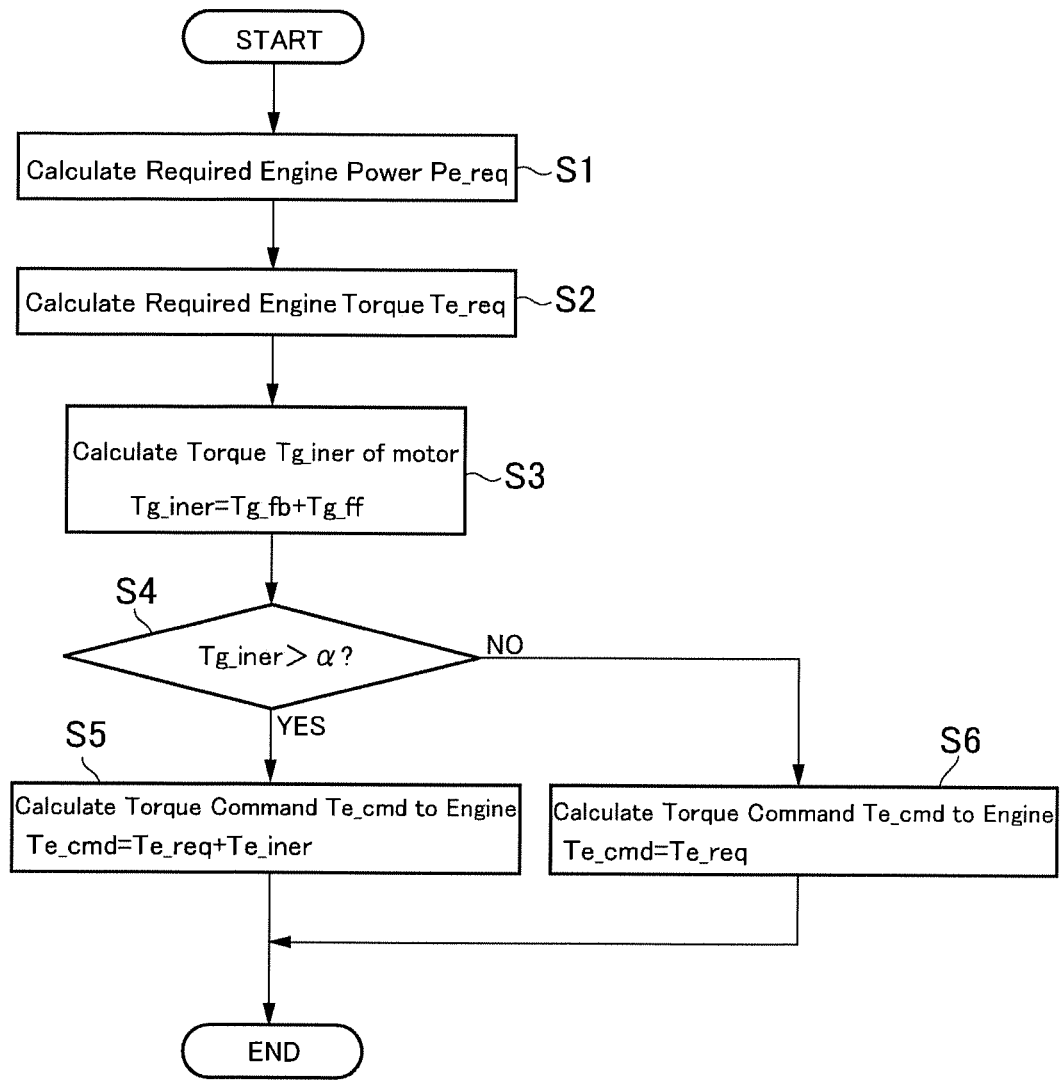
FIG. 2 is a flowchart showing a routine executed by the control system according to the embodiment of the present disclosure.

Turning to FIG. 2, there is shown a routine to calculate a torque command Te_cmd to the engine 1 as the "output torque" of the engine 1 depending on an acceleration demand.

At step S1, a required engine power Pe_req is calculated based on a required drive force. For example, the required drive force may be obtained with reference to a map for determining the required drive force based on a position of the accelerator pedal and a vehicle speed.

Then, at step S2, the required engine torque Te_req is calculated. Specifically, the required engine torque Te_req is the power required by the driver to propel the vehicle Ve, and for example, the required engine torque Te_req is governed by a position of the accelerator pedal. At step S2, therefore, the required engine torque Te_req may be calculated based on the required drive force and the current engine speed.

Then, at step S3, the torque Tg_iner being generated by the first motor 2 to increase the engine speed Ne is obtained by a feedback and feedforward methods. At step S3, the feedback control is executed to obtain a feedback torque Tg_fb based on a difference between the actual engine speed Ne and a target engine speed Ne_req in the current routine, and the feedforward control is executed to obtain a feedforward torque Tg_ff based on a difference between the target engine speed Ne_req in the current routine and a target engine speed Ne_req$_{+1}$ in the next routine. Then, the torque Tg_iner of the first motor 2 is calculated based on the feedback torque Tg_fb and the feedforward torque Tg_ff as expressed by the following expression:

$$Tg\_iner = Tg\_fb + Tg\_ff.$$

Specifically, the feedforward torque Tg_ff is calculated using the flowing formula:

$$Tg\_ff = Ie \cdot K \cdot dNe/dt$$

where "dNe" is an increased amount of the target engine speed Ne_req during execution of one routine, "Ie" is a total inertia moment of the engine 1 and the first motor 2, and "K" is a conversion coefficient to convert a shaft torque of the engine 1 into a shaft torque of the first motor 2. Here, since torque pulse on a rotary shaft of the second motor 3 will not affect the acceleration, the second motor 3 is not considered.

Then, at step S4, it is determined whether or not the torque Tg_iner of the first motor 2 calculated at step S3 is greater than a threshold value $\alpha$. Such determination at step S4 is executed to determine whether or not quick acceleration is demanded by the driver. To this end, specifically, the threshold value $\alpha$ is set to a value greater than zero required to increase the engine speed Ne in a case of accelerating the vehicle Ve quickly. However, the threshold value $\alpha$ may be altered depending on a kind of vehicle or the like.

If the torque Tg_iner of the first motor 2 is greater than the threshold value $\alpha$, that is, if the engine speed Ne is increased abruptly so that the answer of step S4 is YES, the routine progresses to step S5 to calculate the torque command Te_cmd to the engine 1 by adding the inertia torque Te_iner of the engine 1 converted from the torque Tg_iner generated by the first motor 2 to the required engine torque Te_req, as expressed by the flowing expression:

$$Te\_cmd = Te\_req + Te\_iner.$$

In this case, the speed control of the engine 1 by the first motor 2 is temporarily ceased while generating the inertia torque Te_iner of the engine 1 by the engine 1 itself. In this situation, the first motor 2 generates only the reaction torque against the required engine torque Te_req, and the operating point of the engine 1 may be deviated from the optimally fuel efficient point toward the point to generate the maximum output torque Te_max of the engine 1. Then, the routine returns.

Figure 3:
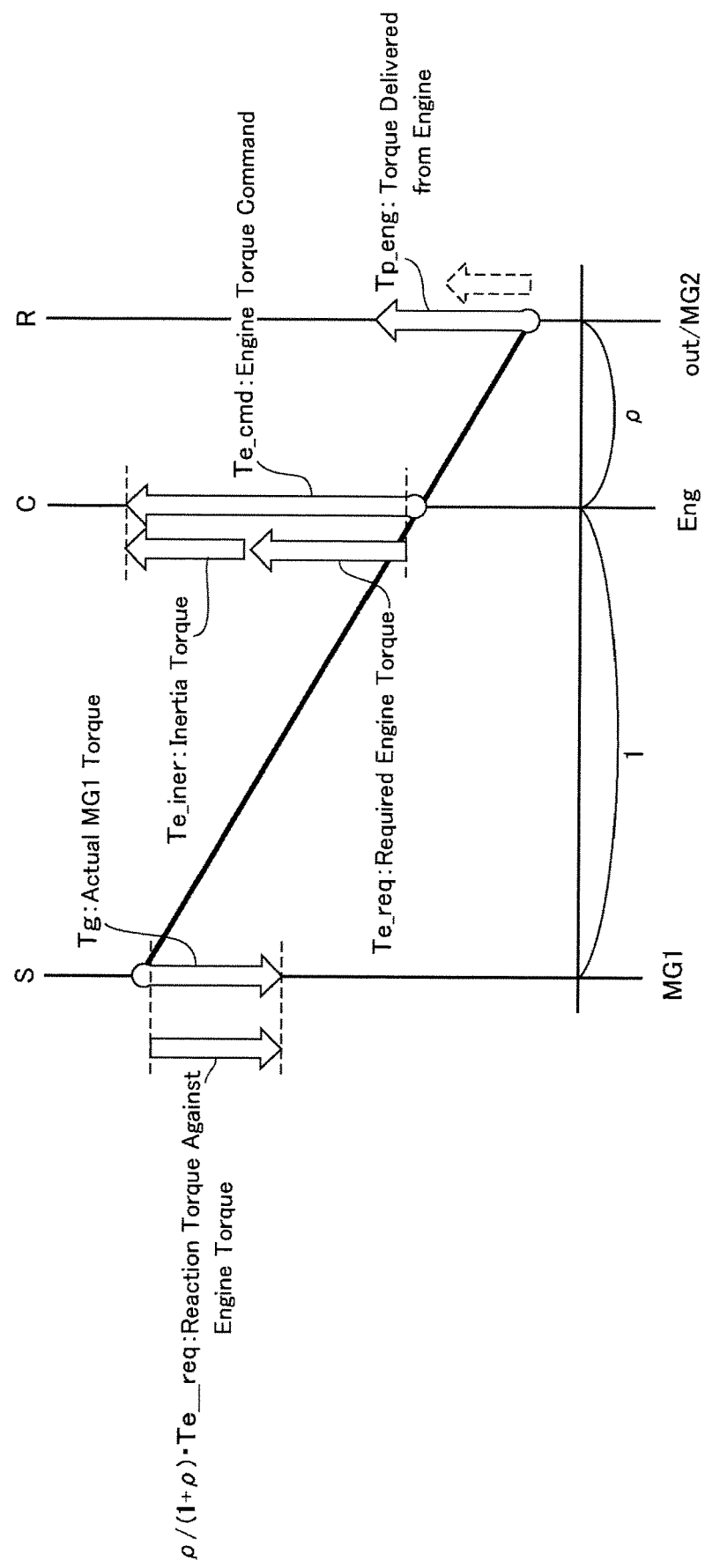
FIG. 3 is a monographic diagram showing torques of rotary elements of the power split device.

Situation of the powertrain in the case that the torque Tg_iner of the first motor 2 is greater than the threshold value $\alpha$, that is, in the case of accelerating the vehicle Ve quickly is shown in FIG. 3. As shown in FIG. 3, in the power split device 4, the sun gear 7 is connected to the first motor 2, the carrier 9 is connected to the engine 1, and the ring gear 8 is connected to the second motor 3. A gear ratio $\rho$ of the power split device 4 is governed by a ratio between teeth numbers of the sun gear 7 and the ring gear 8. In FIG. 3, a gear ratio $\rho$ of the power split device 4 is indicated as a ratio of a clearance between vertical lines representing the sun gear 7 and the carrier 9 to a clearance between vertical lines the carrier 9 and the ring gear 8. A rotational speed of each of the sun gear 7, the carrier 9 and the ring gear 8 is individually indicated as a vertical level on each vertical line, and a rotational direction of each of the sun gear 7, the carrier 9 and the ring gear 8 is individually indicated by an arrow.

Specifically, FIG. 3 indicates an operating condition of the power split device 4 in the HV mode. As indicated in FIG. 3, in the HV mode, the engine 1 generates the required engine torque Te_req, and the first motor 2 serves as a generator to generate the reaction torque acting in the opposite direction to the engine torque Te (i.e., in the counter direction) to deliver the engine torque Te to the drive wheels 6.

As described, in the case of accelerating the vehicle Ve quickly, the engine 1 generates torque corresponding to the inertia torque Te_iner of the engine 1 in addition to the required engine torque Te_req. Specifically, as shown in FIG. 3, the upward arrow representing the torque command Te_cmd includes the inertia torque Te_iner and the required engine torque Te_req. In this situation, as indicated by the downward arrow, the first motor 2 generates only the reaction torque corresponding to the required engine torque Te_req so that an engine torque Tp_eng delivered mechanically to the drive wheels 6 from the ring gear 8 will not be reduced.

By contrast, if the torque Tg_iner of the first motor 2 is smaller than a threshold value $\alpha$, that is, if the engine speed Ne is increased mildly or the vehicle Ve is not accelerated so that the answer of step S4 is NO, the routine progresses to step S6 to employ the required engine torque Te_req as the torque command Te_cmd to the engine 1 as expressed by the flowing equality:

$$Te\_cmd = Te\_req.$$

In this case, the first motor 2 generates the torque Tg_iner to control the engine speed Ne, in addition to the reaction torque counteracting the required engine torque Te_req. Then, the routine returns. The routine shown in FIG. 2 is repeated periodically, and a time period required to complete one routine corresponds to the "predetermined period of time" of the embodiments.

Figure 4:
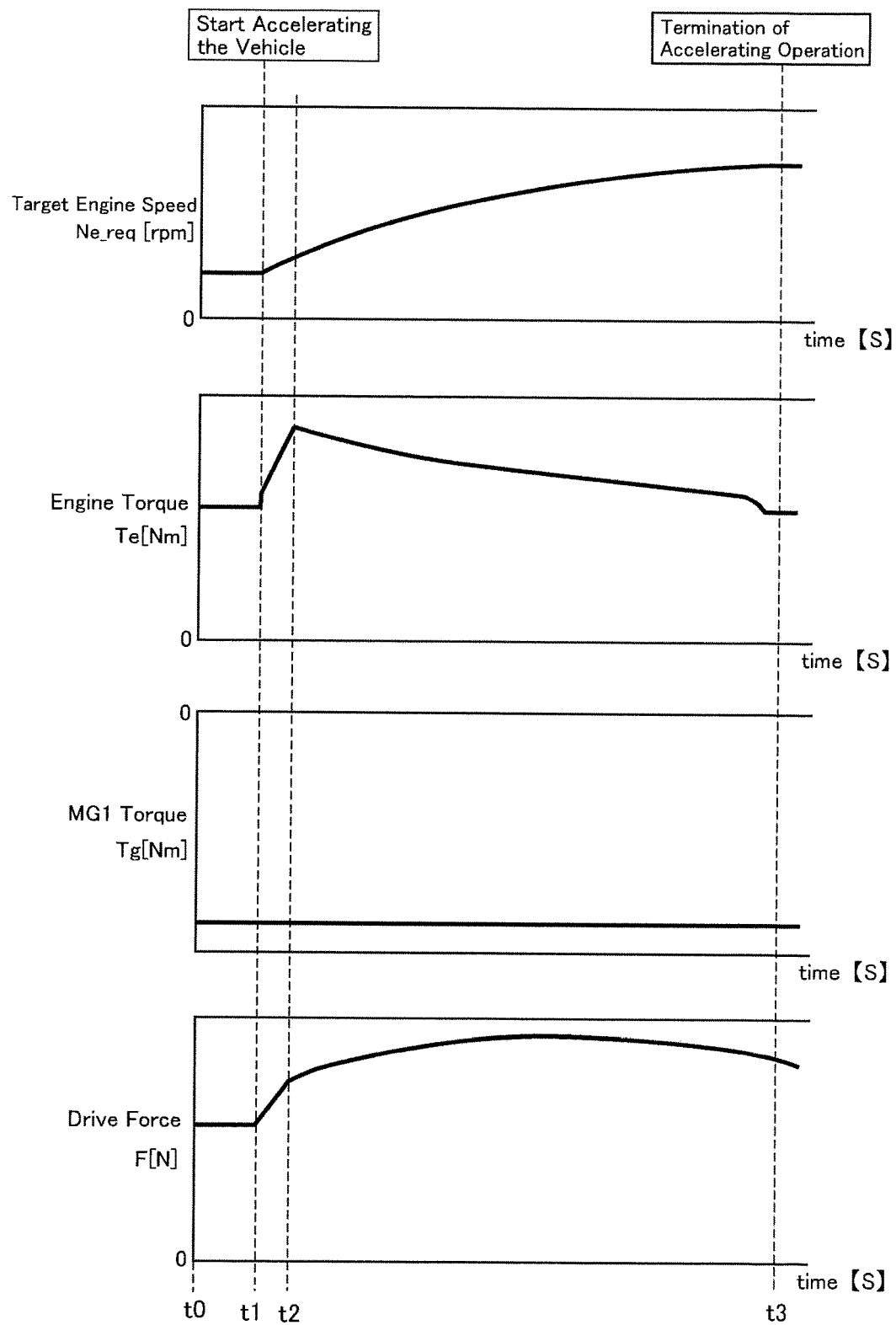
FIG. 4 is a time-chart showing temporal changes in target engine speed, engine torque, motor torque and drive force during execution of the routine shown in FIG. 2.

FIG. 4 is a time chart showing temporal changes in the target engine speed Ne_req, the torque Te of the engine 1, the torque Tg of the first motor 2, and the drive force F, in the case that the torque Tg_iner of the first motor 2 is greater than the threshold value $\alpha$.

At point t0, the vehicle Ve is cruising in the HV mode, and hence the target engine speed Ne_req, the torque Te of the engine 1, the torque Tg of the first motor 2 and the drive force F are constant.

At point t1, quick acceleration is required, and the torque $Tg\_iner$ of the first motor 2 to increase the engine speed Ne exceeds the threshold value α. In this situation, the engine speed Ne is increased quickly from point t1 to point t2, and the engine torque Te is increased from point t1 in accordance with the torque command $Te\_cmd$ calculated by adding the inertia torque $Te\_iner$ to the required engine torque $Te\_req$.

In this situation, the first motor 2 generates only the reaction torque against the required engine torque $Te\_req$, and hence the torque Tg of the first motor 2 is constant. Consequently, the drive force F is increased quickly from point t1. In this case, therefore, the engine torque $Tp\_eng$ delivered mechanically to the drive wheels 6 is not reduced and generating amount of the first motor 2 serving as a generator is increased. In addition, since the output power of the second motor 3 is also increased, the drive force F of the drive wheels 6 is increased.

The target engine speed $Ne\_req$ is continuously increased from point t2, but an increasing rate of the target engine speed $Ne\_req$ is reduced from point t2. In this situation, the ECU 20 determines that the engine speed Ne is raised to a certain level. Consequently, the inertia torque $Te\_iner$ of the engine 1 is reduced with such reduction in the increasing rate of the target engine speed $Ne\_req$. In this situation, since the inertia torque $Te\_iner$ of the engine 1 is reduced, the engine torque Te is reduced from point t2 with such reduction in the inertia torque $Te\_iner$, and an increasing rate of the drive force F is also reduced with such reduction in the engine torque Te.

At point t3, the target engine speed $Ne\_req$ becomes constant, and the engine torque Te is reduced to the level at point t0. That is, an accelerating operation of the vehicle Ve is terminated at point t3. As can be seen from FIG. 4, the first motor 2 generates only the reaction torque against the required engine torque $Te\_req$ consistently during the accelerating operation of the vehicle Ve, and hence the torque Tg of the first motor 2 is constant from point t0 to point t3.

Thus, if the torque $Tg\_iner$ of the first motor 2 to increase the engine speed Ne is greater than the threshold value α when accelerating the vehicle Ve, the engine 1 generates not only the required engine torque $Te\_req$ but also the inertia torque $Te\_iner$ of the engine 1 itself. That is, when accelerating the vehicle Ve quickly, the speed control of the engine 1 by the first motor 2 is temporarily ceased while operating the first motor 2 as a generator to generate the reaction torque against the required engine torque $Te\_req$. For this reason, the engine torque $Tp\_eng$ delivered mechanically to the drive wheels 6 is not reduced. In FIG. 3, the dashed arrow represents the engine torque $Tp\_eng$ delivered mechanically to the drive wheels 6 in the case that the first motor 2 generates the torque $Tg\_iner$ to control the engine speed Ne. According to the embodiments of the present disclosure, therefore, the required engine torque $Te\_req$ may be delivered to the drive wheels 6 without being decreased irrespective of magnitude of the inertia torque of the engine 1. For this reason, the vehicle Ve can be accelerated to achieve the acceleration demand of the driver.

In addition, in the case that the first motor 2 serves as a generator to generate only the reaction torque against the required engine torque $Te\_req$, generating amount of the first motor 2 may be increased thereby increasing the output torque of the second motor 3. In this case, therefore, the drive force F may be increased to accelerate the vehicle Ve more quickly.

As described, the maximum output torque $Te\_max$ of the engine 1 that is applied to the carrier 9 is greater than the maximum output torque $Tg\_max$ of the first motor 2 that is applied to the carrier 9. According to the embodiments of the present disclosure, in the case of accelerating the vehicle quickly, the engine 1 generates not only the required engine torque $Te\_req$ but also the inertia torque $Te\_iner$ of the engine 1 itself. In this case, therefore, the engine 1 may generate larger torque than the first motor 2 to accelerate the vehicle. In addition, the output torque of the engine 1 may be boosted by the supercharger 21.

Although the above exemplary embodiments of the present application have been described, it will be understood by those skilled in the art that the present application should not be limited to the described exemplary embodiments, and various changes and modifications can be made within the spirit and scope of the present application. For example, the output torque of the engine 1 may also be increased by increasing a total displacement of the engine 1 instead of using the supercharger 21.

In addition, a larger motor whose maximum output torque $Tg\_max$ is greater than the maximum output torque $Te\_max$ of the engine 1 may be used as the e first motor 2. In this case, the engine 1 may also be operated to generate the torque corresponding to the inertia torque $Te\_iner$ of the engine 1 itself in addition to the required engine torque $Te\_req$.

Further, the routine shown in FIG. 2 may also be executed when the vehicle Ve is accelerated during propulsion in the EV mode and hence the operating mode is shifted to the HV mode. In addition, the routine shown in FIG. 2 may be executed throughout the entire speed range.

Furthermore, the control system according to the embodiments of the present disclosure may be applied to any kind of hybrid vehicles. For example, the control system may also be applied to a hybrid vehicle in which the rotor shaft 2*b* of the first motor 2 and the rotor shaft 3*b* of the second motor 3 are arranged coaxially, and to a one-motor type hybrid vehicle. in addition, in the powertrain of the hybrid vehicle, clutches and brakes may be added arbitrarily according to need.

What is claimed is:

1. A control system for a hybrid vehicle, comprising:
   an engine;
   an output member transmitting power to drive wheels;
   a motor having a generating function; and
   a power split device that distributes output torque of the engine to the output member and the motor;
   wherein the power split device includes an input element connected to the engine, a reaction element connected the motor, and an output element connected to the output member,
   wherein the motor generates a reaction torque against the output torque of the engine generated based on a required engine torque when accelerating the vehicle so as to deliver the output torque of the engine to the drive wheels, and
   wherein the control system comprises a controller, the controller including microcomputer for executing programs stored in memory thereof, the controller is configured to:
   calculate the output torque of the engine by adding an inertia torque of the engine that is required to increase an engine speed to the required engine torque when accelerating the vehicle, and wherein the output torque of the engine is further calculated by adding the inertia torque of the engine to the required engine torque, when the inertia torque of the engine is greater than a predetermined threshold value, and when accelerating the vehicle;

output the calculated output torque of the engine by the engine; and output the reaction torque against the required engine torque.

2. The control system for the hybrid vehicle as claimed in claim 1, wherein the controller is further configured to calculate the torque of the motor corresponding to the inertia torque of the engine based on a difference between an actual engine speed and a target engine speed in a current routine, and based on a difference between the target engine speed in the current routine and the target engine speed after a lapse of predetermined period of time.

3. The control system for the hybrid vehicle as claimed in claim 1, wherein the controller is further configured to:

calculate the torque command to the engine based only on the required engine torque when the motor generates torque corresponding to the inertia torque of the engine to increase the engine speed, and the torque of the motor is smaller than the predetermined threshold value;

control the engine in such a manner as to generate torque based on the calculated torque command; and control the motor in such a manner as to generate the reaction torque against the required engine torque and the torque to increase the engine speed.

4. The control system for the hybrid vehicle as claimed in claim 1, wherein a maximum output torque of the engine that is applied to the input element of the power split device to increase the engine speed is greater than a maximum output torque of the motor that is applied to the input element of the power split device to increase the engine speed.

5. The control system for the hybrid vehicle as claimed in claim 4, further comprising:

a torque booster that boosts the output torque of the engine to increase the engine speed.

6. The control system for the hybrid vehicle as claimed in claim 1, further comprising:

another motor that is disposed between the output member and the drive wheels, wherein said another motor is operated by supplying electric power generated by the motor to generate torque applied to the drive wheels.

\* \* \* \* \*